No. 724,480. PATENTED APR. 7, 1903.
J. KENNEDY.
ATTACHMENT FOR GRAIN SEPARATORS.
APPLICATION FILED MAY 1, 1902.
NO MODEL.
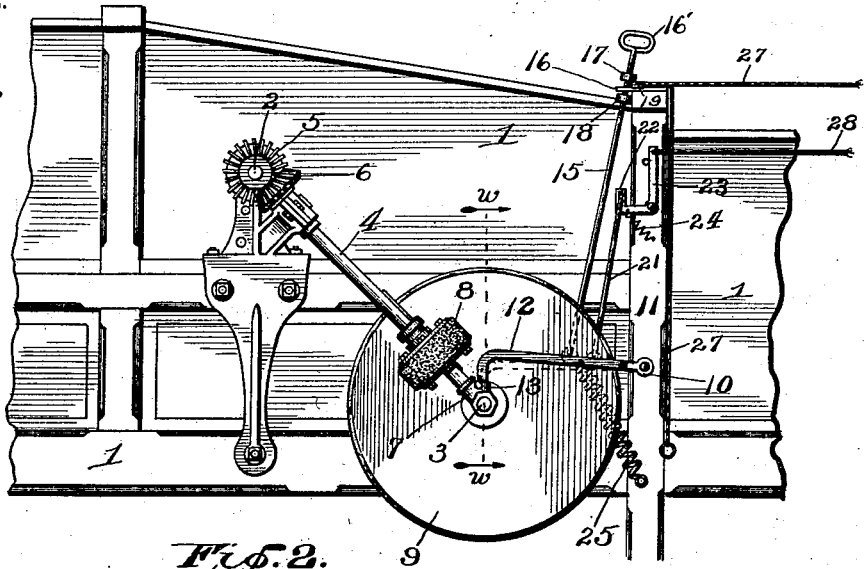
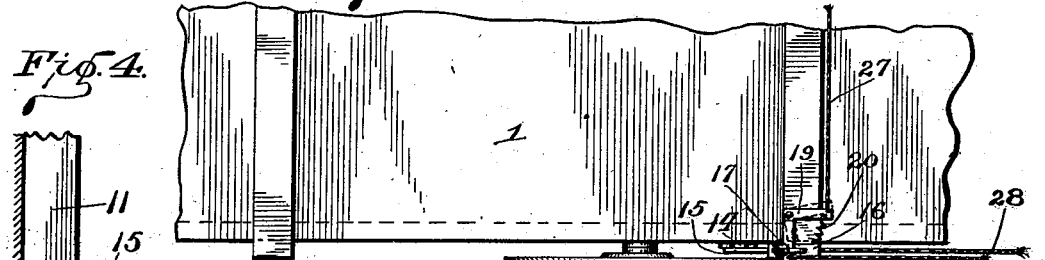
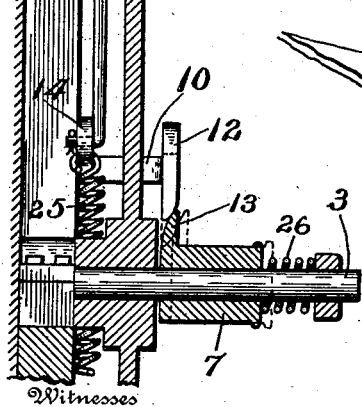
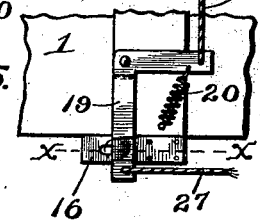
Witnesses
C. S. Frye
E. K. Marshall
Inventor
James Kennedy,
By W. T. Fitzgerald
Attorneys

UNITED STATES PATENT OFFICE.

JAMES KENNEDY, OF BRISTOL, ILLINOIS.

ATTACHMENT FOR GRAIN-SEPARATORS.

SPECIFICATION forming part of Letters Patent No. 724,480, dated April 7, 1903.

Application filed May 1, 1902. Serial No. 105,429. (No model.)

*To all whom it may concern:*

Be it known that I, JAMES KENNEDY, a citizen of the United States, residing at Bristol, in the county of Kendall and State of Illinois, have invented certain new and useful Improvements in Attachments for Grain-Separators; and I do hereby declare the following to be a full, clear, and exact description of the invention, such as will enable others skilled in the art to which it appertains to make and use the same.

My invention relates to that class of band-cutters and feeders that are adapted to be connected with a threshing-machine and be driven by power derived therefrom.

My object is to provide a means for throwing the band-cutting and feeding mechanism into and out of gear, so as to start and stop the device from feeding grain to the threshing-cylinders without regard to the speed of rotation.

With these objects in view the invention consists of certain novel features of construction and arrangement of parts, as will be hereinafter more fully described and pointed out in the claims.

In the accompanying drawings, Figure 1 is a side elevation of a portion of a band-cutter and feeder showing the device applied thereto. Fig. 2 is a top plan view thereof. Fig. 3 is a perspective view of the controlling-levers with the accessory parts removed. Fig. 4 is a detail sectional view as seen from the dotted line *w w* in Fig. 1. Fig. 5 is a detail view of the tripping mechanism, and Fig. 6 is a sectional view on line *x x* of Fig. 5.

In the accompanying drawings, 1 indicates the frame of a band-cutter and feeder which may be of any form or construction, 2 the shaft to which power is applied from the separator, and 3 the shaft to which the feeding mechanism is attached.

Mounted in suitable bearings upon the side of the frame 1 is a shaft 4, the said shaft being geared to the shaft 2 by means of the bevel-gears 5 and 6. The lower end of the shaft 4 is rotatably mounted in a T-shaped joint 7, said joint being mounted upon the outer end of the shaft 3 and adapted to slide thereon.

Mounted upon the shaft 4 and adapted to slide thereon is a small friction-wheel 8, designed to engage with and transmit power to the large friction-disk 9, rigidly mounted upon the shaft 3.

In operating the band-cutter and feeder in connection with a threshing-machine it becomes necessary at times to stop the feeding mechanism without checking the speed of the separator, and to this end I have pivotally mounted a bifurcated shifting-lever 10 upon the upright post 11 of the frame 1, the arm 12 of said lever being bent downwardly at its outer or free end to engage with the lug 13 upon the T-joint 7. The face of the arm 12 and lug 13 are slightly beveled to better coöperate with each other. The other arm 14 of the shifting lever 10 receives the lower end of the lifting-rod 15. This rod passes up through an orifice in the guiding-plate 16 and has at its upper end a handhold 16ª. Adjustably secured upon the rod 15 above and below the plate 16 are collars 17 and 18. The collar 17 engages with and rests upon the bell-crank trip-lever 19 and when so engaged prevents the arm 12 from being pulled into engagement with the lug 13. The collar 17 also prevents the arm 12 from being pulled too far down, while the collar 18 regulates the upward movement of the arm 12. The bell-crank trip-lever 19 is held normally under the collar 17 by the spring 20. The arm 14 also receives the lower end of a lifting-rod 21, the upper end of said rod finding a bearing in the slotted end 22 of the L-shaped lifting-lever 23, said lever being held normally in the position shown in Fig. 1 by the spring 24.

In operation should it become necessary to stop the feed of the grain into the separator the bell-crank trip-lever or latch 19 is pulled from under the collar 17, when the arm 12 of the bifurcated lever 10 will be pulled down by means of the spring 25, thereby pushing the T-joint 7 outwardly, as shown by dotted lines in Fig. 4, thus separating the friction-wheel 8 from the friction-disk 9 and allowing the shaft 3, which carries the feeding mechanism, to stop running. The T-joint 7 is held normally in juxtaposition to the friction-disk 9 by means of a spring 26, the tension upon the spring being regulated by a nut on the end of the shaft 3. It will also be understood that the bearing carrying the shaft 4 will yield a sufficient distance to compensate for the outward movement of the lower end of said shaft.

In order to operate the latch 19 from different points along the sides of the separator, I provide cables 27, which may be carried to any part of the separator desired, and by pulling thereon the latch will be pulled from under the nut 17 and the arm 12 allowed to be drawn into engagement with the lug 13, and thereby separate the friction-wheel and disk.

The arm 12 may be lifted out of engagement with the T-joint 7 by means of the rod 15; but in order that the arm may be lifted by any one at the rear of the machine I attach a cable 28 to the upwardly-extending arm of the L-shaped lever 23, so that by pulling upon said cable through the medium of the rod 21 the arm 12 may be drawn up until the latch 19 passes beneath the collar 17, thereby supporting the lever 10 out of contact with the T-joint 7.

It will be understood that additional cables may be attached to the lever 23 and carried to convenient points upon the separator and the lever 10 be operated thereby.

Having thus fully described my invention, what I claim as new, and desire to secure by Letters Patent, is—

1. In a device of the character described, the combination with the driving-wheel and its shaft, of a friction-disk mounted to revolve in contact with said wheel, a shaft carrying the same, a T-shaped joint in which the lower end of the shaft of the friction-disk revolves, said joint being mounted upon the shaft of the driving-wheel, and a pivoted lever and connections for moving said joint and a spring acting on said joint to hold it in its normal position and a spring-actuated lifting-rod engaging the shifting lever.

2. In a device of the character described, the combination with the feed-mechanism shaft and a driving-wheel fast thereon, of a T-shaped joint slidingly mounted on said shaft and having a lug with beveled face, a spring acting on said joint, an inclined shaft having its lower end rotatably mounted in said T-shaped joint, a friction-disk carried by said shaft and a bifurcated lever having a lug with beveled face to engage the beveled face of the lug of said joint and a lifting-rod connected with said bifurcated lever, substantially as described.

3. In a device of the character described, the combination with the frame and the driving-wheel and its shaft, a T-shaped joint 7 slidingly mounted on said shaft adjacent said driving-wheel and having an upwardly-extending lug on the end adjacent said wheel and beveled on its inner face, a shaft 4 stepped in said T-shaped joint, a bifurcated shifting lever mounted upon the frame and having an end bent downwardly and beveled to engage the beveled lug of the T-shaped joint, a lifting-rod received by the other arm of said shifting lever and a spring acting on the same to pull it downward, as and for the purpose specified.

4. In a device of the character described, the combination with the frame and the driving-wheel and its shaft, of a T-shaped joint 7 slidingly mounted on said shaft adjacent said driving-wheel and having an upwardly-extending lug on the end adjacent said wheel and beveled on its inner face, a shaft 4 stepped in said T-shaped joint, a bifurcated shifting lever mounted upon the frame and having an end bent downwardly and beveled to engage the beveled lug of the T-shaped joint, a lifting-rod received by the other arm of said shifting lever, a spring acting on the same to pull it downward, adjustable collars upon said rod, a bell-crank trip-lever engaging one of said collars, a spring acting on said trip-lever, and an L-shaped lifting-lever having a slotted end receiving the lower end of the lifting-rod, substantially as shown and described.

In testimony whereof I affix my signature in presence of two witnesses.

JAMES KENNEDY.

Witnesses:
JOSEPH J. KENNEDY,
MORGAN R. BENNETT.